No. 659,433. Patented Oct. 9, 1900.
C. L. BUCKINGHAM & E. GERMANN.
PERFORATOR FOR PREPARING TELEGRAPHIC MESSAGES.
(Application filed Jan. 13, 1898.)

(No Model.) 9 Sheets—Sheet 1.

Fig. 1.

WITNESSES:
C. E. Ashley
H. W. Lloyd

INVENTORS:
By their Attorney

No. 659,433. Patented Oct. 9, 1900.
C. L. BUCKINGHAM & E. GERMANN.
PERFORATOR FOR PREPARING TELEGRAPHIC MESSAGES.
(Application filed Jan. 13, 1898.)
(No Model.) 9 Sheets—Sheet 2.

Fig. 2.

WITNESSES:
C. E. Ashley
H. W. Lloyd

INVENTORS:
C. L. Buckingham
E. Germann
By their Attorney
C. L. Buckingham

No. 659,433. Patented Oct. 9, 1900.
C. L. BUCKINGHAM & E. GERMANN.
PERFORATOR FOR PREPARING TELEGRAPHIC MESSAGES.
(Application filed Jan. 13, 1898.)

(No Model.) 9 Sheets—Sheet 3.

WITNESSES:
C. E. Ashley
H. W. Lloyd

INVENTORS:
C. L. Buckingham
E. Germann
By their Attorney
C. L. Buckingham

No. 659,433. Patented Oct. 9, 1900.
C. L. BUCKINGHAM & E. GERMANN.
PERFORATOR FOR PREPARING TELEGRAPHIC MESSAGES.
(Application filed Jan. 13, 1898.)
(No Model.) 9 Sheets—Sheet 4.

WITNESSES:
C. E. Ashley
H. W. Lloyd

INVENTORS:
By their Attorney

No. 659,433. Patented Oct. 9, 1900.
C. L. BUCKINGHAM & E. GERMANN.
PERFORATOR FOR PREPARING TELEGRAPHIC MESSAGES.
(Application filed Jan. 13, 1898.)
(No Model.) 9 Sheets—Sheet 7.

WITNESSES:
C. E. Ashley
H. W. Lloyd

INVENTORS:
C. L. Buckingham
E. Germann
By their Attorney
C. L. Buckingham

UNITED STATES PATENT OFFICE.

CHARLES L. BUCKINGHAM AND EMIL GERMANN, OF NEW YORK, N. Y.; SAID GERMANN ASSIGNOR TO SAID BUCKINGHAM.

PERFORATOR FOR PREPARING TELEGRAPHIC MESSAGES.

SPECIFICATION forming part of Letters Patent No. 659,433, dated October 9, 1900.

Application filed January 13, 1898. Serial No. 666,552. (No model.)

*To all whom it may concern:*

Be it known that we, CHARLES L. BUCKINGHAM, of the city of New York, county of New York, and EMIL GERMANN, of New York, (Brooklyn,) county of Kings, State of New York, citizens of the United States of America, have invented certain new and useful Improvements in Perforators for Preparing Telegraphic Messages, of which the following is a specification.

The apparatus of our present invention is primarily designed for use in perforating a strip of paper adapted to be used in a Wheatstone or other telegraph transmitter with groups of perforations, each group of which represents a letter of the alphabet or other character; but the apparatus may be used for other purposes. The various improvements are shown as carried out in a machine provided with two gangs or rows of punches organized to perforate the material in two rows of perforations, and is particularly adapted to make perforations in groups representing the Morse alphabet and as well letters of an alphabet by which messages may be transmitted and reproduced at the receiving end of a telegraph-line in type-printed characters.

The general object of the present improvements is to provide an efficient and rapidly-operating machine in which the action is controlled by a series of selecting keys or levers, one for each group or order of perforations to be produced in the blank strip, each key operating as a selecting device to determine which of the punches shall be operated, and in this connection there are employed, in combination, a series of punches and actuating devices, a series of controlling or selecting keys for bringing into action at the same time different punches, whereby groups of holes may be punched which are differently disposed or are of different number in the different groups, a variable paper-feed having a series of special pins or devices which individually control the extent of the feed, and means of control by the keys for setting different ones of the said devices into operative position according to the length of the group of perforations produced by the depression of each key. To this end we employ electromagnets for actuating the punches, and to control their action we also employ a series of circuit-controllers, which are selected by the keys according to the character of the group or series of perforations to be produced, and to control or set the individual pins or devices which determine the extent of the feed we also employ electromagnets, one for each device, the circuits of said magnets being closed by the keys or otherwise when the punches are operated. It is to be understood, however, that the invention is not limited to the use of electromagnets, as the punches might be actuated by other power whose action might be controlled through the keys by other means—in the nature, for instance, of mechanical coupling appliances; also, that the feed-determining devices might be set by other appliances than electromagnets governed by the punch-controlling keys. In the arrangements shown in Patents No. 568,512, granted to C. L. Buckingham, E. Germann, and J. W. A. Gardam, dated September 29, 1896, and No. 568,516, granted to C. L. Buckingham, J. Gardam, and E. Germann, dated September 29, 1896, there is an iron box containing a series of electromagnets, one for each punch employed in the perforator. These magnets occupy considerable space, and the entire number are designed to operate upon the several punches of the punch-head within a very small space. One of the important features of the present invention is that arrangement of the punch-actuating magnets whereby the armatures may be connected to the several punches without interference one with the other, at the same time leaving a free space for a vertical chip-chute leading from the punch-head downward through the base of the machine. To this end the entire arrangement of apparatus set forth in the patents referred to has been reorganized, as will now be described.

In the accompanying drawings.

Figures 3, 4:
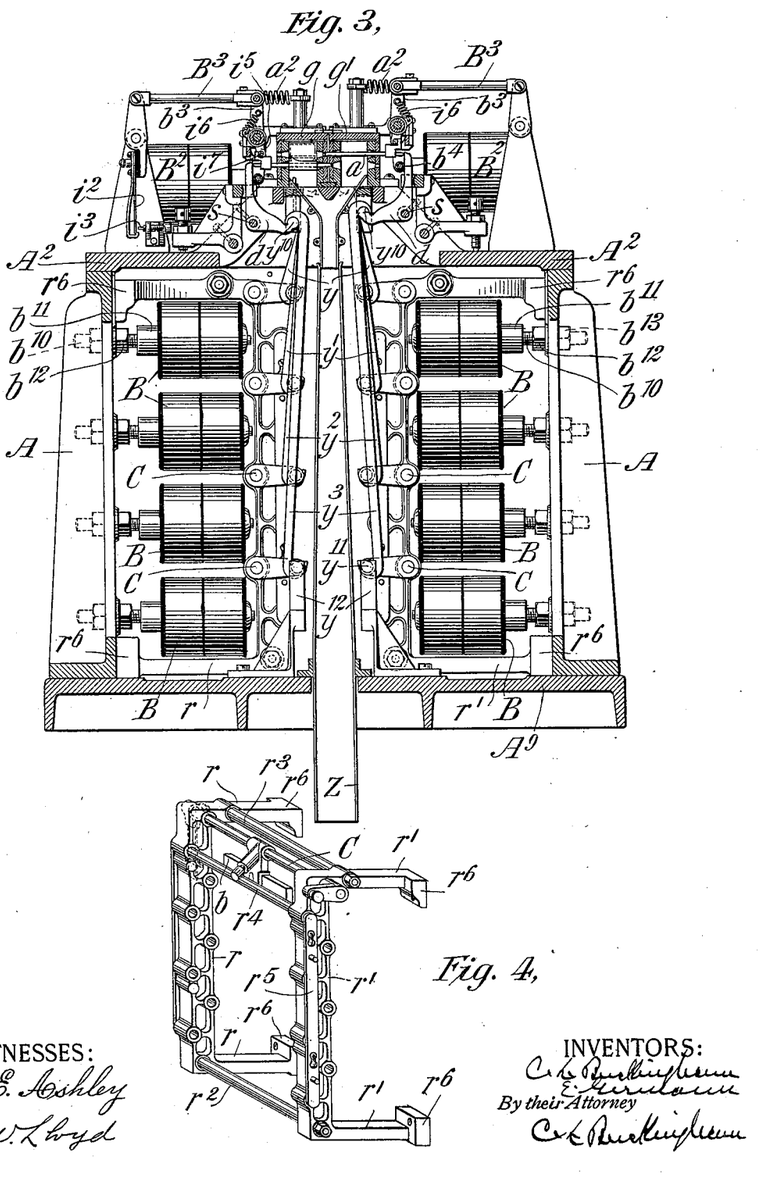
Fig. 3 is a view showing a central cross-section of the punch-head and chip-chute and a side view of the punch-magnets, armature-shafts, and links reaching upward therefrom to the elbow-levers which actuate the punches.
Fig. 4 represents one of the frames which serve as supports for the four vertical ranges of punch-magnets within the perforator-box.
Figures 7, 10:
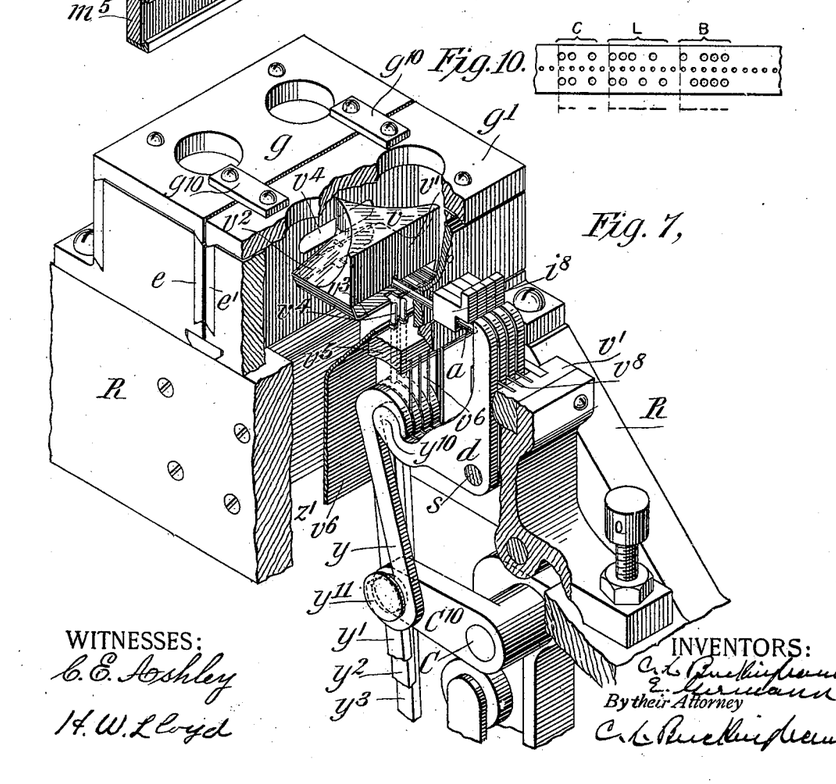
Fig. 7 is a perspective view showing in part the exterior outlines of the punch-head, also the interior arrangement and essential features thereof.
Fig. 10 is a diagram representing the same characters perforated according to the Morse alphabet.

As shown, there are two series of eight punches each employed in the punch-head, although each series may consist of a greater or less number. Thus in machines for perforating fillets of paper adapted to the ordinary Wheatstone transmitter as the punches in each series are arranged ten to the inch the punches in each series must be included within a space of eight-tenths of an inch, and within this narrow space the actuating-magnets or other motors must be applied to or connected with the punches. As shown in Figs. 3 and 7, each punch is thrust forward by a lever $d$, preferably of bell-crank form, which in turn is actuated by an electromagnet B through a link connecting lever $d$ with a crank of the armature-shaft of B.

Figures 5, 17, 18:
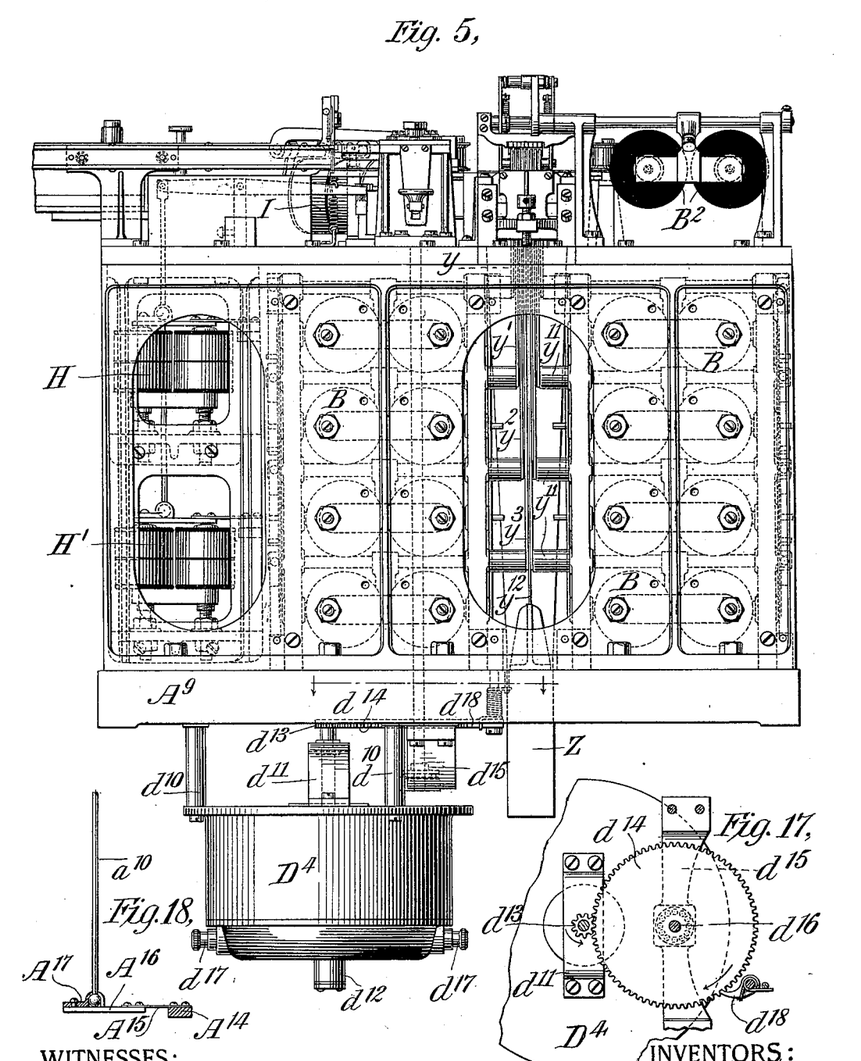
Fig. 5 is a side view of the perforator, showing the punch-head and appurtenant devices mounted upon the top plate, the magnet system within the iron box below the top plate, and the motor located beneath the bottom of the iron box which serves to actuate the feed-wheel.
Fig. 17 is a diagram showing the gear-train and its mountings for connecting the motor with the feed-wheel shaft.
Fig. 18 is a diagram showing an armature of one of the feed-wheel magnets and the joint-connection between said armature and the vertical link extending upward to connection with one of the radial feed-bars.

To enable the box or supporting-frame inclosing the magnets to be reduced to a minimum length, we have arranged the magnets in two vertical rows on each side of the punch-head, the two rows being placed symmetrically with relation to a central plane through the punch-head, so that the series of four magnets B on the right, as shown in Fig. 5, are brought into operative relation with the four right punches of one series, while the four magnets at the left are in operative relation with the four left punches of the row. The difficulty of connecting the armature-shafts C with the elbow-levers $d$ within this narrow space would obviously be great if the links and elbow-levers were given an ordinary rivet connection, from the fact that the thickness of $d$ added to the thickness of the link with projecting rivet-heads could not well be placed within a lateral space of one-tenth of an inch. To avoid this difficulty, the bell-cranks $d$ are provided at their lower extremities with round heads $y^{10}$, over which the upper ends of the links $y$ are hooked, thus affording an adequate thickness of metal for strength and a round journal-bearing. The lower ends of the links are also provided with hooks, which are passed underneath the pins $y^{11}$ of the cranks $C^{10}$ of the armature-shaft C. With this arrangement the links may be made adequately strong without interference one with another. Nor is it difficult to provide against lateral movement of the lower ends of the links, as the heads of the crank-pins may be enlarged, thus affording journal-grooves for the lower ends of the links. At the same time the upper end of each link and the lower end of the corresponding lever $d$ are kept in their proper plane, one coinciding with the other, by means of the teeth of a comb or thin projecting plates $v^6$, which project downward from a cross-bar $v^5$, and to further provide against lateral movement and interference we employ a second comb, whose teeth $v^8$ project from a cross-bar $v'$ between the upper portions of the bell-cranks $d$. An additional purpose in placing the magnets in vertical series becomes obvious by reference to Figs. 3 and 5. As particularly shown in Fig. 5, link $y$ actuates the extreme left punch and is connected with a crank upon the armature-shaft of the upper magnet B, while the second, third, and fourth punches are respectively connected with cranks upon the armature-shafts of the second, third, and fourth magnets in downward order. This is accomplished by making the crank-pins longer as we proceed downward, for by this arrangement obviously the link $y^3$ will clear the crank-pin to which link $y^2$ is connected, link $y^2$ the crank-pin to which link $y'$ is connected, and link $y'$ the crank-pin to which link $y$ is connected. Manifestly the several crank-pins in each series of four if made of equal length would require the links to project downward at different angles from a vertical line to avoid interference each with the others, thereby requiring the magnets to be put not one directly above another, but in different vertical planes. Moreover, while such an arrangement would require a material widening of the machine the levers $d$ could not be made of one pattern, as is desirable for economical construction.

From the preceding description it will be seen that each punch $a$, its bell-crank $d$, the double-hooked link, and the corresponding crank-journal are all in one vertical plane and that from the crank-journal to the punch there is a direct application to the punch of the force of the motor by which it is driven.

Figure 1:
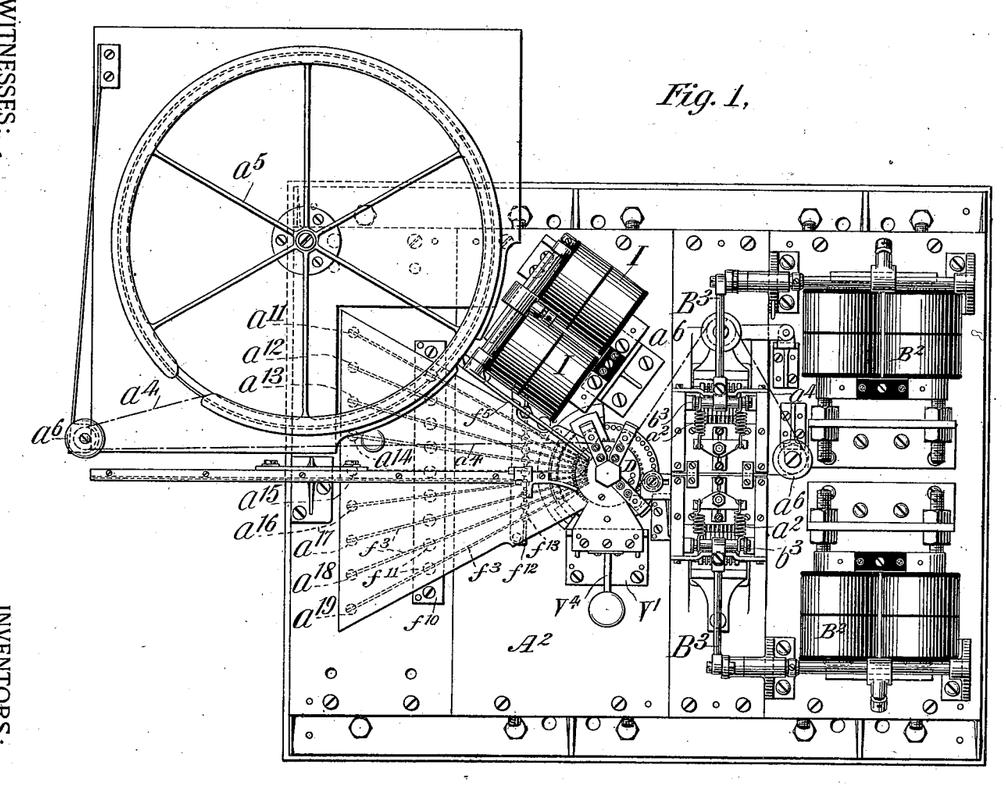
Figure 1 is a plan view of the perforating-machine, showing the top plate, punch-head, feed-wheel, and appurtenant devices mounted thereon.
Figure 2:
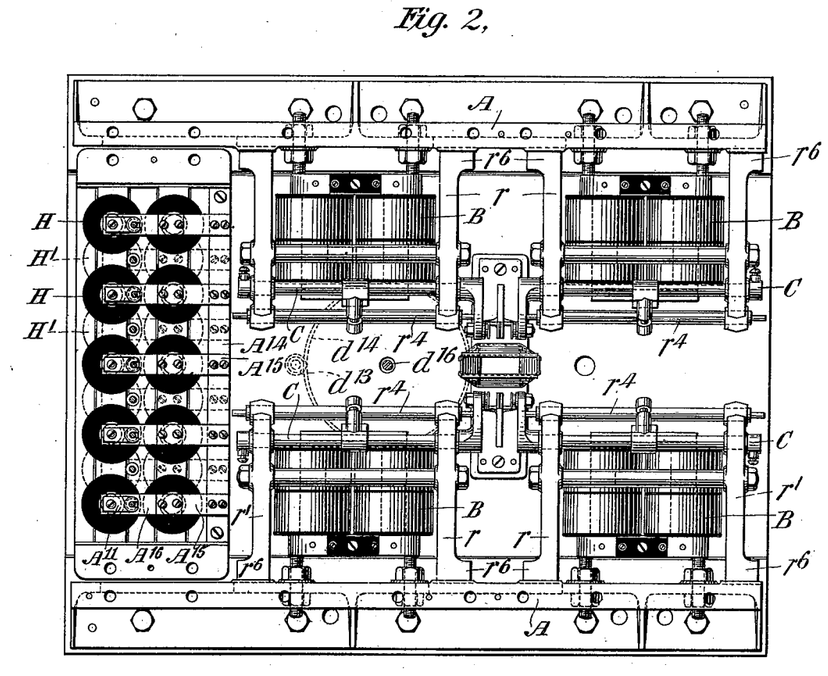
Fig. 2 is a plan view of the interior arrangement of the magnets and supporting-frames as they appear upon removal of the top plate, as shown in Fig. 1.

To facilitate the arrangement of magnets B in groups, as indicated in Figs. 2, 3, and 4, we employ a supporting-frame, preferably formed of a strong iron box, having removable top plates $A^2$ and two side plates $A$, which are fixed firmly upon a strong iron base $A^9$, and within this box are fixed to the side plates the four vertical groups of horseshoe-magnets B, the yokes and cores being placed in horizontal planes. A top view of these four magnet groups is shown in Fig. 2, while two of them—one group at the right and the other at the left of the punch-head—are seen in Fig. 3. The two groups at one side of the punch-head are shown in Fig. 5. In assembling the machine the heel-pieces $b^{11}$ of these magnets are first fastened to the side plates A, each by two horizontal screws $b^{10}$ and nuts $b^{12}$ $b^{13}$, and thereafter each of the four groups of magnets when thus placed in position is surrounded by an auxiliary iron frame. (Shown in Fig. 4.) Each of the four frames is made of side pieces $r$ $r'$, having feet $r^6$, by which it may be screwed or otherwise fastened to a side plate A, while the side pieces are held together by horizontal bolts or rods $r^2$ $r^3$, thus forming a structure which as a whole may be removed from the iron box, leaving the magnets B free of access. The principal purpose of the auxiliary frame is to carry the armatures, their shafts, and back-stops, and to this end each of the said pieces is provided with a set of four vertical holes within which the armature-shafts C are held, while a second set of four holes is employed within which rods $r^4$ are inserted, which serve as back-stops for the armatures. The armature-shafts C and the cranks are held in place within the side frames $r$ $r'$ by collars, while the back-stop rods $r^4$ are held against lengthwise movement at each end by a thin vertical side plate $r^5$, having upper and lower openings, which at their lower sides are so enlarged as to pass over the heads of screws or bolts projecting outward from the side frames. Thus the side pieces $r^5$ may first be lifted vertically and then drawn outward over the screw-heads, leaving the stop-rods $r^4$ free for removal. This is an important feature of our organization from the fact that it enables the back-stop rods to be easily removed and the armature-shafts, with their cranks, to be so turned that the links $y$ $y'$ $y^2$ $y^3$ may be unhooked therefrom and then removed from the bell-cranks $d$. Moreover, this construction permits the employment of very many duplicate parts in the organization of a machine. For instance, all of the sixteen armatures are alike, as are the armature-shafts and the back-stop bars. Again, in building up the four auxiliary frames the side pieces $r$ $r'$ may be made of cast-iron and all of like construction, while only very small surfaces or parts of them require to be accurately dressed either to fit them to the side plates A of the machine or to accurately locate the cranks of the armature-shafts. Thus it is seen that in the construction of a perforator having sixteen punches many parts of the organization are duplicated sixteen times and that a large part of the machine is practically made up of sixteen duplicate arrangements each extending from a punch by a bell-crank lever, a link, a crank, a crank-shaft, and magnets B. The links for each group of magnets are of different lengths; but in their manufacture this is a feature of but little importance. It is also to be noted, as seen in Fig. 3, that the links for controlling the series of punches at the right are slightly longer than those at the left, since the punches at the right, which are employed to perforate the upper row of holes in the paper tape, are higher than the punches at the left for perforating the lower row. Corresponding links on the two sides of the machine might be made of equal length; but the advantage thus gained would not offset the difficulty of raising the magnets on one side of the machine above those on the other. Moreover, to raise the magnets on one side of the machine higher than those on the other would destroy the appearance of symmetry. As shown in Fig. 3, the links extend downward from the levers $d$ to the armature-cranks in compact arrangement, leaving a free open space underneath the punch-head for a vertical chip-chute Z, thus enabling the chips from the punches to be removed without the aid of a special blower, heretofore necessary, a feature of our present invention which we regard as of special importance. The chip-chute extends downward through the base of the machine by a single opening $z$, while at its upper end there are two branch openings $z'$ $z^2$, extending into the punch-head on either side of the dies. The chips produced by the lower row of punches are thrust outward into the right cavity of the punch-head below the upper punches and are dropped into the opening $z'$. On the other side, however, the upper row of punches would, in the absence of provision therefor, cause chips to drop upon those of the lower range. The punches being close together, the chips would not find their way between them, and without some device for promptly removing the chips the machine would soon become inoperative. To avoid this difficulty, we have provided a shield (shown in Figs. 3 and 7) surrounding the lower row of punches upon which the chips from the right gang of punches are dropped. This shield has a thin metallic plate $v^3$, extending below the lower punches $a$, which is rigidly fixed at each side to a roof or housing which covers them. In detail the housing consists of a vertical plate $v'$, an upper horizontal plate $v$, curved portions $v^2$, against which the chips are projected, and the lower horizontal plate extending below the punches. The upper plate $v$ is close to the under side of the plate $g'$, while the vertical plate $v'$ is in close proximity to the back plate of the punch-head cavity. From this construction the chips would fall from the curved surfaces $v^2$ into the branch of the chip-chute $z^2$; but to provide against all possibility of clogging, the housing, with its lower plate surrounding the horizontal punches $a$, is made free to vibrate, while projecting upward through cavities in the comb-bar $v^5$ are loose pins $v^4$, which normally rest against the upper ends of the links $y'$ $y^2$. Thus in the operation of the perforator each time that the links $y'$ $y^2$ are called into action the pins $v^4$ are thrown upward, striking the lower side of the housing $v^3$, thereby giving the structure a continuous vibratory movement and insuring a removal of the chips as they are forced from the upper row of punches $a$ out of the orifice $v^4$ upon the curved surfaces $v^2$ of the shield. Thus it is seen that this housing is a separate and distinct structure having a horizontal aperture near its bottom, through which all of the punches $a$ on one side of the machine pass, and that below the punches is a flat bottom or plate $v^3$, which at either side of the punches is bent upward and made an integral part of the upper portion of the housing—that is to say, the part above the punches; and it is also seen from Fig. 7 that the aperture or orifice from which the chips from the opposite upper row of the punches issue is somewhat above the floor of this shield, the latter of which has two curved surfaces $v^2$ facing the orifice. As the chips issue from the orifice the shields tend to force them sidewise, so that they may drop into the chute; but to insure such an action the shield is struck by the upright pins $v^4$ each time that a character is perforated, inasmuch as the upper ends of such vertical pins $v^4$ normally rest a short distance below the plate or shield $v^3$, while their lower ends normally rest upon the upper curved surfaces of the links $y'$ $y^2$. When the links are lowered by the magnets, they drop away from pins $v^4$; but upon their return movement they strike the lower ends of said pins $v^4$, causing them to hit the under side of the shield, thus giving it a slight movement or jar. The pins $v^4$ are provided with collars, and thereby their lower ends are prevented from following the links $y'$ $y^2$ when depressed, as the pins are then supported by the collars, which rest upon the upper surface of the comb-bar $v^5$. In its essential features the punch-head of the perforator is like that of the patents already referred to—to wit, Nos. 568,512 and 568,516—there being in the organization two top plates $g$ $g'$ on opposite sides of the die-plates $e$ $e'$, which are bound together by bars $g^{10}$, while the end plates of the punch-head are rigidly fixed to the base-bars R, extending upward and transversely across the top of the machine. Other views of this organization are shown in Figs. 1, 3, and 5, in which appear the assisting-magnets $B^2$, which are brought into action simultaneously with the punch-magnets, putting links $B^3$ in tension to stretch the springs $a^2$, and thereby to relieve the punch-magnets and the bell-crank levers from the resistance which they would otherwise encounter from the cross-bars $b^4$ at the lower end of the rock-bars $b^3$. In this arrangement the bars $b^3$ are pivoted near their central points, and upon their journals are carried sleeves having upper and lower elbow-arms. The upper arms are connected by springs $i^6$ with the upper ends of the levers $b^3$, while the lower arms carry pins $i^7$, which serve as retractors for the punches. Each punch near its outer end is provided with a small metal block, rigidly attached thereto, having an upwardly-projecting tooth, and it is against these teeth that the pins $i^7$ are forced to withdraw the punches when the bell-crank levers $d$ move backward. Thus it is seen that when the punch-magnets B operate corresponding links are pulled downward, thereby pushing forward the upper ends of the bell-cranks $d$ to force the punches through the paper. At the same time magnets $B^2$ move the upper ends of the levers $b^3$ away from the punch-head and also pins $b^4$ inwardly away from the upper arms of levers $d$, thus leaving the said levers free to drive the punches. At the same time the power stored in springs $a^2$ will, upon the demagnetization of magnets $B^2$, through the agency of springs $i^6$ and pins $i^7$, force the punches to their back or retracted position.

Figure 6:
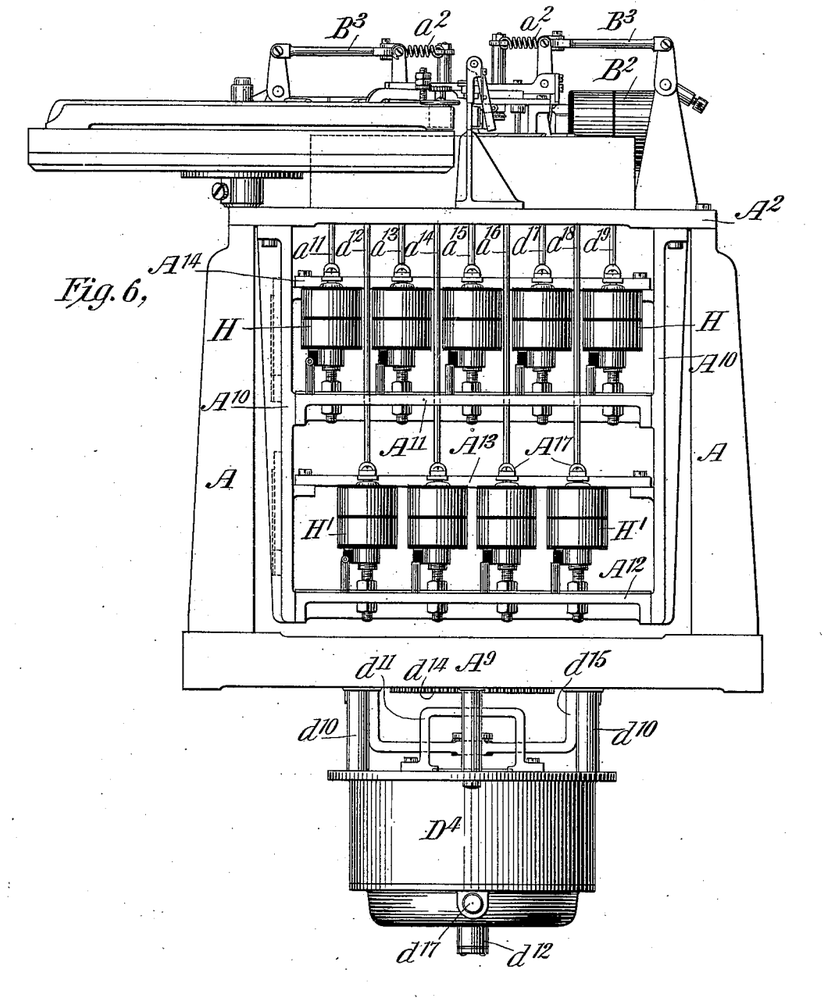
Fig. 6 is an end view of the perforator, showing the punch-head upon the top plate, the magnets within the iron box for controlling the step-by-step movement of the feed-wheel through varying distances, an iron frame carrying such magnets, and the motor beneath the bottom of the iron box for actuating the feed-wheel.

Another important feature of our invention refers to the arrangement of apparatus for controlling the variable step-by-step movement of the feed-wheel. In our former patents referred to the several magnets employed in this connection were mounted upon the top plate of the perforator. To adapt the machine, however, for the Morse as well as for the printer alphabet, a wider range of feed variation becomes necessary. In fact, for the Morse alphabet nine different steps of feed are necessary, thereby rendering indispensable the employment of nine magnets and nine bars extending therefrom to the feed-wheel. As these bars must not be of great length, while at their inner ends they must be placed only one-tenth of an inch apart, it would become impossible within ordinary dimensions to place the feed-controlling magnets upon the top plate. To this end we have arranged the feed-magnets in two vertical tiers H H' beneath the top plate, as shown in Figs. 2, 5, and 6, with upwardly-projecting links $a^{11}$ to $a^{19}$, the upper ends of which are respectively connected with the nine radial bars $f^3$. Not only does this plan afford a compact arrangement of many feed-magnets, but it enables the bars $f^3$ to be made straight, as shown in Fig. 1, rather than in bent form, as shown in Patent No. 568,516. The arrangement also leads to marked economy of construction in that the radial bars $f^3$ may have their outer extremities in a straight line where connected with the downwardly-projecting links $a^{11}$ to $a^{19}$, while they may be pivoted or supported in slotted pins $f^{11}$, inserted in a straight bar $f^{10}$. To insure an accurate movement of the inner ends of bars $f^3$, that they may not strike other than the desired pins of the feed-wheel, they may be held in place by a simple comb having teeth $f^{13}$, projecting upward from a base-bar $f^{12}$. As here shown, the comb is in a straight line, though it may be formed of a circular plate concentric with the feed-wheel, having vertical spaces cut therein, within which the bars $f^3$ may move. As a support for this arrangement of feed-magnets, we employ a removable frame, within which are placed both magnets and armatures. As shown in Fig. 6, within the main side plates A and at one end is placed a crate or auxiliary frame consisting of vertical sides $A^{10}$, which are screwed onto the top plate $A^2$, while between the sides $A^{10}$ are placed two platforms $A^{11}$ and $A^{12}$, supporting the magnets, and two bars $A^{13}$ and $A^{14}$, to which the armatures $A^{16}$ are connected, preferably by leaf-springs $A^{15}$. The links $a^{11}$ to $a^{19}$ are each connected to the armature by a ball-and-socket joint, formed of a removable bracket $A^{17}$, attached near the outer end of the armature and over a ball at the lower end of the link, thus affording a fastening whereby the armatures may readily be disconnected from their links, leaving the entire crate of magnets removable upon withdrawing the screws which connect plates $A^{10}$ with top plate $A^2$. Obviously this organization enables economy of space and simplicity of construction while offering a wide variation in the length of feed. Moreover, it enables the machine below the top plate to be readily taken apart and reassembled without disturbing a large number of parts.

Figures 8, 9:
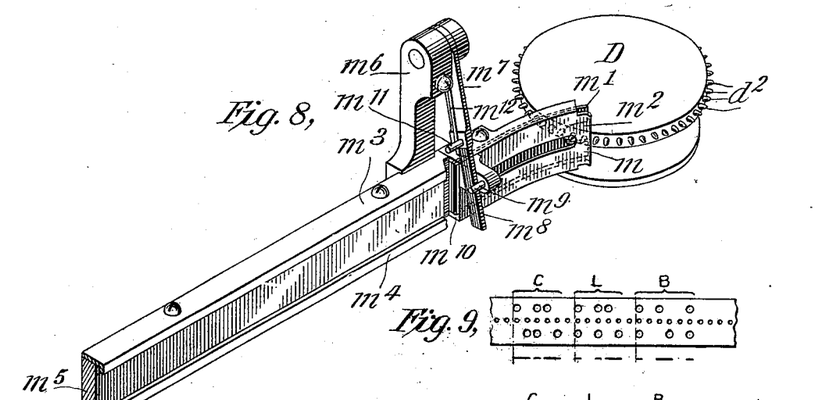
Fig. 8 represents an outline of the feed-wheel, a stripping device therefor, and a chute or conduit for guiding from the punch-head the perforated fillet a considerable distance within easy observation of the operator. This view also shows a knife mounted upon the chute by which at the end of a message the fillet of paper may be cut off.
Fig. 9 is a diagram representing the letters "c l b" of one of the alphabets, which may be perforated by the machine, which is adapted for reproducing messages in printed characters.
Figures 11, 12, 13:
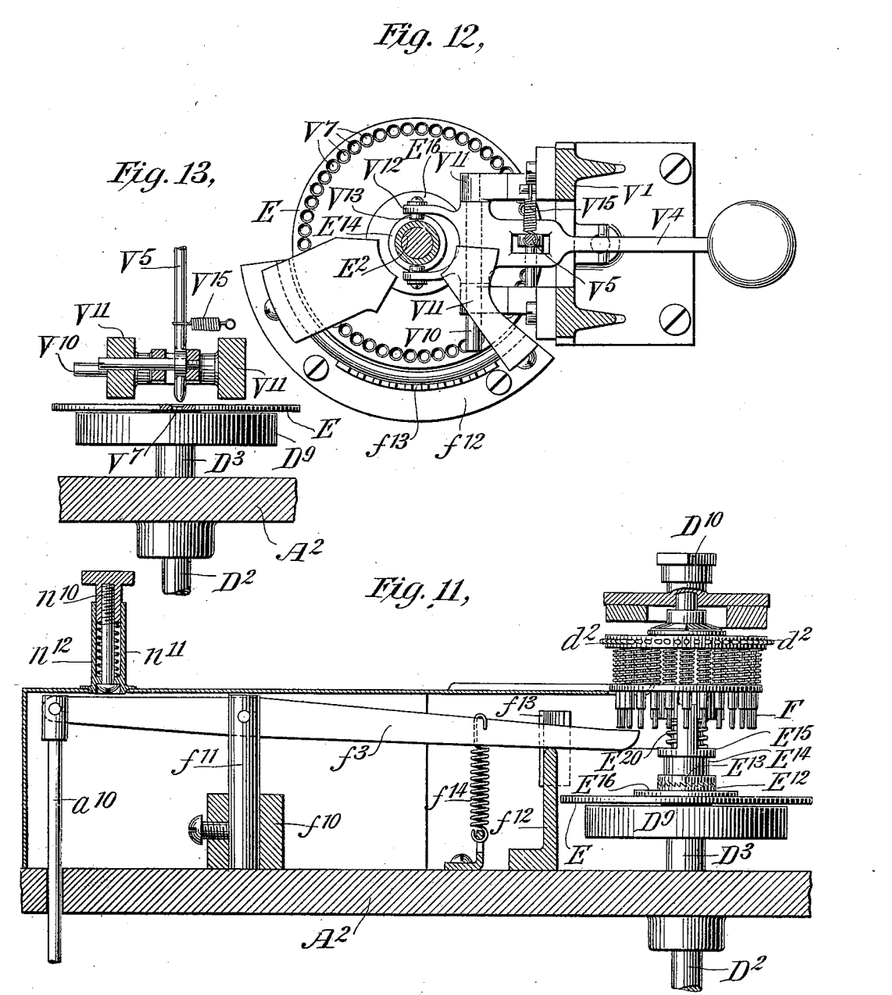
Fig. 11 is a side view of the feed-wheel and one of the series of arms employed for striking up the pins of said wheel. This view also shows some of the features whereby it may, as desired, be disconnected from its driving-motor, thus enabling the wheel to be freely rotated forward and backward.
Fig. 12 is a top view of parts particularly relating to the feed-wheel-disengaging device.
Fig. 13 also shows a side view of details of said disengaging apparatus.

An important feature of our invention is shown in Figs. 1 and 8, which consists of a paper-guide by which the perforated fillets of paper are discharged from the feed-wheel and the machine, at the same time leaving the message over a considerable length of tape in clear view of the operator. To this end the feed-wheel D, having small radial teeth $d^2$, by which the fillet of paper is impelled, is provided with a stripper formed of two plates, the outer of which, $m^2$, may or may not be slotted lengthwise, while the inner plate is necessarily so slotted to form two short prongs $m$ $m'$, between which the teeth $d^2$ of wheel D project. By this means the paper fillet is first stripped from teeth $d^2$ and thence forced outward through the remaining part of the chute, which is formed of a back plate $m^5$, an upper ledge $m^3$, and a lower one $m^4$. The fillet of paper is thrust along as it leaves the feed-wheel by its own rigidity. This we have found perfectly feasible. To do so, it is necessary that the strip be closely surrounded by the chute; but, as we have shown, the paper strip may be sufficiently confined, although the front part of the chute next to the operator may be left open along its entire length. To sever the paper fillet after the completion of a message, we employ a blade $m^8$, attached to a shank $m^7$, which is pivoted at $m^6$ in an upright bracket. Normally the blade remains in a retracted position out of the path of the chute, and to this end a spring $m^{12}$, attached to the bracket, presses against a pin $m^{11}$, forming a part of the blade, which forces the blade away from the chute and against a stationary back-stop $m^9$.

Figure 14:
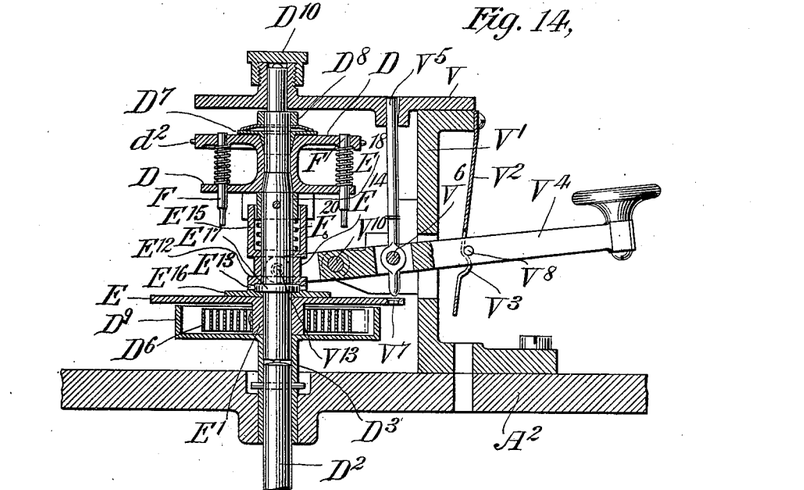
Fig. 14 shows the disengaging apparatus, partly in section, in that position where the feed-wheel and motor are rigidly connected together.
Figure 15:
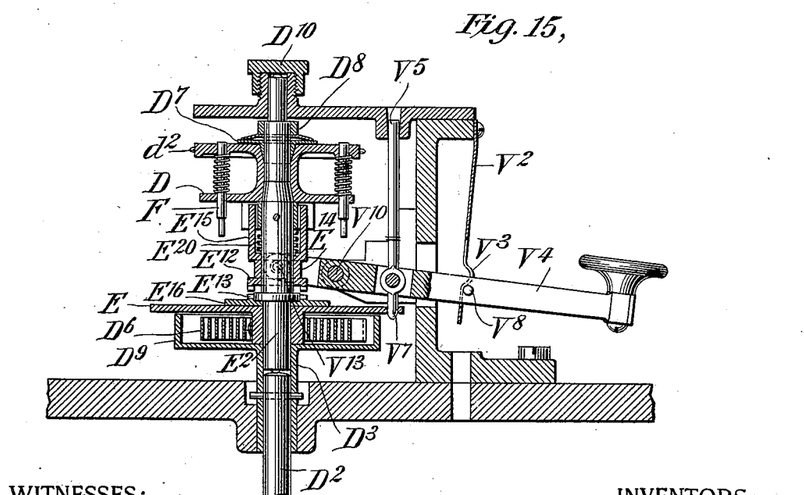
Fig. 15 is a like view showing the arrangement of Fig. 14, with the feed-wheel disengaged from the motor.

Another feature of our invention is the special means employed for disconnecting the feed-wheel from its driving-motor to enable said wheel to be freely moved forward or backward for the insertion of a new tape or when it may be desired to move the tape backward to correct errors in a message. This arrangement is represented in Figs. 11 to 15. The shaft $D^2$, connecting the feed-wheel with the motor $D^4$ beneath the base of the machine, has pinned to its upper end a sleeve $D^3$, the upper end of which forms a spring-barrel $D^9$, to which is attached one end of the spiral spring $D^6$, the other end being secured to the hub of plate E, upon which is rigidly fixed a circular plate $E^{16}$, having upwardly-projecting ratchet-teeth $E^{13}$, which normally engage corresponding teeth in the hub $E^{12}$. In the same hub is a circular groove $E^{14}$, and prongs $E^{15}$ project within corresponding cavities in a hub $E^{18}$, forming a part of or secured to the feed-wheel D. The feed-wheel is tightly fastened to the shaft $E^2$; but, as will now be seen, it may be released from the spring-barrel and shaft $D^2$ and the motor by raising the teeth of $E^{12}$ from the teeth $E^{13}$. It is seen that the plate $E^{12}$ and the prongs $E^{15}$ have a longitudinal movement along shaft $E^2$, but are rotated therewith, and that shaft $E^2$ is locked with plate E and one end of spring $D^6$ when the teeth of $E^{12}$ are locked with teeth $E^{13}$; but upon raising the teeth $E^{13}$ from the teeth of $E^{12}$ plate E would run away, and spring $D^6$ would be unwound if the plate were not otherwise arrested. To this end we employ a manual key $V^4$, carrying a stop-pin $V^5$ at the right of its pivot $V^{10}$ and at its left end two friction rollers or pins $V^{13}$, particularly shown in Fig. 12, which project within the circular groove $E^{14}$. As shown in Fig. 14, the lower sides of these friction rollers or pins normally rest near the lower ledge of the groove $E^{14}$, while at the same time the lower end of pin $V^5$, which is connected at point $V^6$ with lever $V^4$, is held upward above the cavities $V^7$ in the circular arrangement near the rim of E. Upon depressing lever $V^4$ the two pins $V^{13}$ are raised some distance before their upper sides strike the upper ledge of groove $E^{14}$, thereby lifting the teeth $E^{13}$ from the teeth of $E^{12}$; but during this movement the pin $V^5$ will have entered the cavity $V^7$, thus locking the plate E against rotation before the teeth of $E^{12}$ have been separated from teeth $E^{13}$. Obviously lever $V^4$ should be firmly held in an extreme upper position when the feed-wheel is connected with the motor and likewise in an extreme downward position when the feed-wheel is disconnected, and this is accomplished by providing lever $V^4$ with a pin $V^8$, which slides over and compresses a projection $V^3$ upon a spring $V^2$, which is attached to the upright bracket $V'$. From the preceding description it will also be seen that upon lifting the lever $V^4$ from the lower position shown in Fig. 15 the lower end of pin $V^5$ will not be raised out of the aperture $V^7$ of plate E until the teeth of $E^{12}$ have been fully rejoined with $E^{13}$, thus connecting the feed-wheel and motor together before stop $V^5$ has been removed from the aperture $V^7$.

As shown in preceding patent, No. 568,516, the two ends of the spiral spring $D^6$ were simply locked together when the feed-wheel was disconnected. In the present case, however, current is kept upon the motor and a fixed stop $V^5$ is employed to prevent rotation after disconnection of the feed-wheel, and in this connection we also employ a pawl or back-stop $d^{18}$ to prevent back rotation of the motor under the action of spring $D^6$ when current is shut off, as is seen in Fig. 17 of the drawings. In this arrangement, when key $V^4$ is depressed and $E^{12}$ raised, it becomes necessary to prevent plates E and $E^{16}$ from riding upward, and this we do by employing a collar $E^{17}$ upon shaft $E^2$. It is also apparent that when wheel D is disconnected spring $E^{20}$ will be compressed and that shaft $E^2$ will be given an upward thrust. This we provide against by a thrust-cap $D^{10}$, which is fixed to the top plate V and is placed above the shaft. The feed-wheel D is rigidly secured to the shaft by washers $D^7$ and $D^8$, the upper of which exercises a spring-pressure to drive $D^7$ and its conical bearing downward between wheel F and the shaft, while the wheel itself rests upon a conical seat or enlargement of shaft $E^2$, against which it is tightly driven by said washers $D^7$ and $D^8$. It is to be observed that the hub $E^{18}$ might be made as a solid part of the feed-wheel D, but it may preferably be made as a separate piece and pinned thereto. To secure reëngagement of teeth $E^{13}$ with those of $E^{12}$, a spring $V^{15}$ is employed, which, upon disconnection of the feed-wheel, is stretched so that the teeth of $E^{12}$ are over the openings between teeth $E^{13}$, thus rendering reconnection certain upon replacing lever $V^4$ in its proper position. Thus it is seen from Figs. 14 and 15 that when feed-wheel D is connected to the motor-shaft and is arrested by the fixed stop there will be a strong pressure exerted by the vertical sides of the ratchet-teeth $E^{13}$ against the sides of the upper teeth $E^{12}$. When, however, the feed-wheel is lifted and the teeth $E^{12}$ are raised from the teeth $E^{13}$, the tendency of the feed-wheel is to turn backward to a very slight extent and to bring the points of teeth $E^{12}$ almost directly opposite the points of the lower teeth; but to avoid this difficulty teeth $E^{13}$ are allowed a slight movement in the direction in which they normally run under the tension of spring $D^6$, and this is accomplished by allowing the vertical pin $V^5$ to be slightly moved or carried around after its point has been inserted in one of the apertures $V^7$ of the plate E. To this end the pin is normally held in a substantially-vertical position by the spring $V^{15}$; but after the pin has been lowered into an aperture $V^7$ the spring $D^6$ forces the plate around in such manner as to stretch the spring $V^{15}$, thus displacing $V^5$ and bringing the points of the teeth $E^{13}$ (seen in Figs. 14 and 15) under the aperture of $E^{12}$. It should be understood that before reconnecting the clutch $E^{12}$ $E^{13}$ by lifting the lever $V^4$ a pin of the feed-wheel has been raised and brought against the fixed stop; but while the clutch $E^{12}$ $E^{13}$ is disconnected the feed-wheel has not taken its front position, it not having been subjected to the force of spring $D^6$. For this reason it is necessary that the cavities between teeth $E^{12}$ should be over the points of teeth $E^{13}$ before attempting to lift the bar $V^4$.

The motor for driving the feed-wheel is shown underneath the bottom of the perforator in Figs. 5 and 6, it being attached to base-plate $A^9$ by bolts $D^{10}$, passing through the upper flange of the motor-frame $D^1$. The shaft of the motor is vertical, its lower end resting in a seat $D^{12}$, while its upper end is held by a yoke $D^{11}$, and carries a pinion $D^{13}$, meshing with a large spur-wheel $D^{14}$, the shaft of which is in turn supported, preferably, upon ball-bearings in a hanger $D^{15}$. This is the shaft $D^2$, extending vertically to the top plate and which drives the feed-wheel. By this arrangement the motor is placed out of sight and out of the way and is most advantageously located to efficiently drive the feed-wheel.

In our former patent the magnet I, employed for releasing the feed-wheel, was normally charged. In the present case this magnet is upon normal open circuit, thus enabling the use of a much smaller magnet without heating and without a large waste of electrical current. The circuit-closer for actuating the magnet I which we now use is shown in Fig. 3 and is closed during the perforation of a character, thus causing the arm $f^5$ to be raised at that time. When the punches have been removed, however, at the completion of a perforation, the circuit-closer $i^2$ $i^3$ (shown in Fig. 3) disrupts the circuit, whereupon arm $f^5$ is drawn downward by a retracting-spring, thus dislodging the pin of the feed-wheel by which it was last held to permit the succeeding feed.

Figure 16:
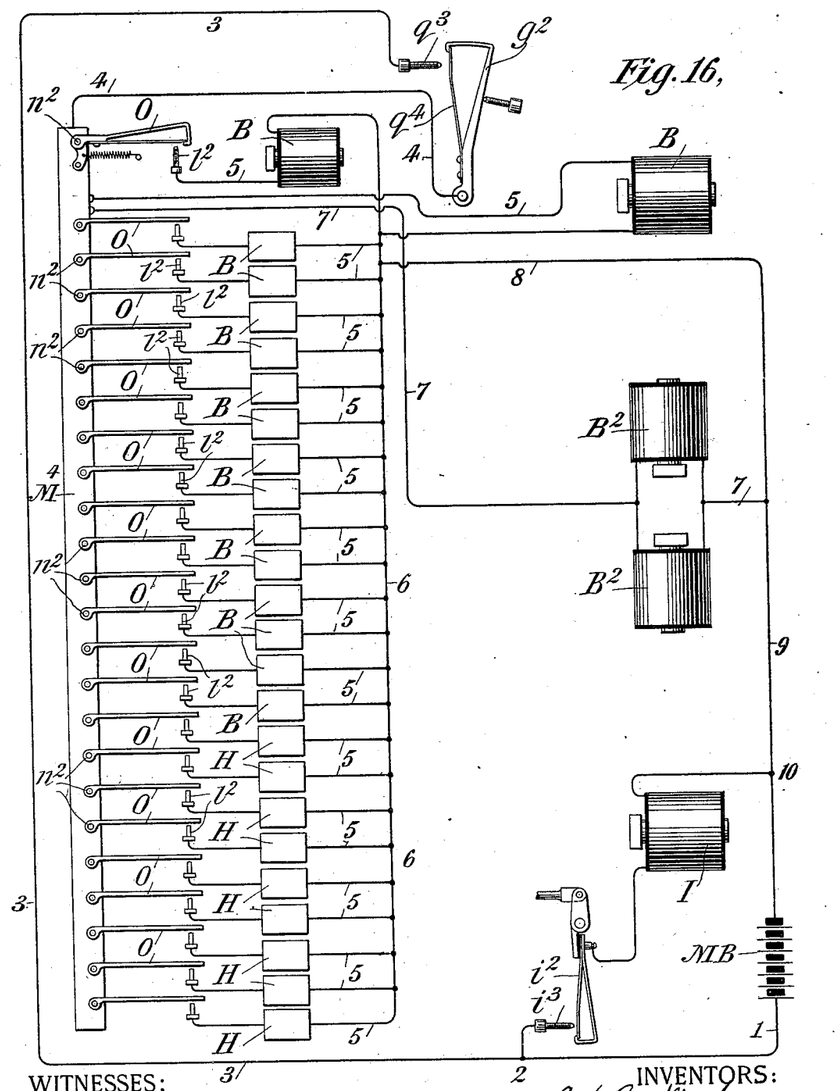
Fig. 16 represents a diagram of circuits, contact devices, and magnets for controlling both the punches of the perforator and its feed-wheel.

Fig. 16 represents a diagram of circuits and magnets similar to those employed in the perforator hereinbefore described. In the present arrangement, however, only two sizes of magnets are employed. Instead of placing the first punch-magnet and the two assisting-magnets $B^2$ in the common return and in series with the many other punch-magnets they, with magnet I, are placed in multiple branches. Thus all of the punch-magnets B, the assisting-magnets $B^2$, and the magnet I for releasing the feed-wheel are of like construction and electrical proportions, the magnets H being of smaller size. In this diagram all of the multiple branches with the exception of that of magnet I lead from a common bar $M^4$ through contacts $n^2$ $l^2$, and thence through the magnets B H $B^2$ $B^2$ by the wires 5, 6, 7, 8, and 9. The common break is shown by the hook-lever $q^2$, spring $q^4$, and stationary stop $q^3$, which are inserted in the circuit between wires 3 and 4, while at $i^2$ and $i^3$ are contacts employed in actuating magnet I.

In the perforator shown in Patent No. 568,516 the motor is applied to the feed-wheel through two trains of spur-gearing, and it is further encumbered with a reeling device for taking up and compactly winding the tape when perforated. With this resistance to be overcome it was found that the motor often failed to promptly start to wind the spring of the feed-wheel. To obviate this difficulty, we have placed the motor beneath the supporting-box in close relation to the shaft of the feed-wheel, which, as here arranged, extends upward in direct line with the axis of said wheel, while the reeling device is replaced by a chute for discharging the tape from the machine independently of the motor.

What we claim, and desire to secure by Letters Patent, is—

1. In a perforating-machine, the combination of a punch-head, one or more series of punches, one or more series of levers, preferably of bell-crank form, for actuating the same, all of like construction, having rounded ends to form a pivot-bearing, and hooked links fitting over the rounded ends of said levers, as and for the purpose set forth.

2. In a perforating-machine, the combination of one or more series of punches, one or more series of levers, preferably of bell-crank form, for actuating the same, having rounded ends, a series of hooked links fitting over the rounded ends of said levers, and a comb whose teeth extend between said levers and links in such manner as to keep each link upon the rounded end of the punch-actuating lever with which it is joined, as and for the purpose set forth.

3. In a perforating-machine, the combination of a punch-head, one or more series of punches, one or more series of actuating-levers, preferably of bell-crank form, all of which at one end are rounded, one or more series of hooked links, each of which fits over the rounded end of the lever which it actuates, a comb whose teeth hold in place each link upon the punch-lever which it actuates, and a second comb whose teeth project between the opposite ends of said punch-actuating levers, as and for the purpose set forth.

4. In a perforating-machine, the combination of a punch-head, a series of punches, a series of actuating-levers, preferably of bell-crank form, all of the same construction, each of which has a rounded end, a corresponding series of double-hooked links of varying length, a series of actuating-magnets placed one above another, each of which is provided with an armature, armature-shaft and a crank-pin, the several crank-pins being in different planes corresponding with the planes of the several links, as and for the purpose set forth.

5. In a perforating-machine, the combination of a punch-head, a series of punches, a series of actuating-levers, preferably of bell-crank form, all of the same construction, each of which has a rounded end, a corresponding series of actuating-motors placed at different distances from the actuating-levers, and link connections for said motors, said links having hooks at their upper ends fitting over the rounded ends of said bell-crank levers in planes corresponding with those of the actuating-levers, as and for the purpose set forth.

6. In a perforating-machine, the combination of a punch-head, a series of punches $a$, a series of actuating-levers, preferably of bell-crank form, $d$, each having rounded ends $y^{10}$, a series of double-hooked links, $y, y', y^2, y^3$, a series of magnets B, one for actuating each punch, and a corresponding series of armature shafts and cranks, over which the lower ends of the hooked links are fitted, in different planes, as and for the purpose set forth.

7. In a perforating-machine, the combination of a punch-head, a series of punches $a$, a corresponding series of actuating-levers $d$, preferably of bell-crank form, all of the same construction and having rounded ends, a series of double-hooked links extending downward in different planes, two series of vertically-arranged motors and crank-shafts actuated thereby with which the lower ends of said links are connected, as and for the purpose set forth.

8. In a perforating-machine, the combination of a punch-head having two series of punches $a$, two series of actuating-levers $d$, preferably of bell-crank form, two series of double-hooked links and four vertical series of actuating-motors B and hooked connections between said links and bell-crank levers $d$ at their upper ends and with the motors below, as and for the purpose set forth.

9. In a perforating-machine, the combination of a punch-head having two sets of punches $a$, two series of actuating-levers $d$, preferably of bell-crank form, two or more series of vertically-arranged motors B, a double set of double-hooked links whose upper ends are hooked upon the levers $d$ and whose lower ends are in hooked connection with the motors B, and a chip-chute Z, as and for the purpose set forth.

10. In a perforating-machine, the combination of a punch-head having two sets of punches, actuating-magnets B arranged in series and a downwardly-projecting chip-chute Z placed between said magnets, as and for the purpose set forth.

11. In a perforating-machine, the combination of a punch-head having two rows of punches $a$, $a$, two series of actuating-levers $d$, preferably of bell-crank form, a double set of double-hooked links, four vertically-arranged series of motors B, crank-shafts of varying length actuated by said motors, the whole being so arranged that the punch-actuated levers of one row of punches are linked only to motors on the same side of the perforator, while the levers for actuating the second row of punches are correspondingly linked only to those motors located on the opposite side of the machine, whereby each and every punch-actuated lever is operated by a motor on the same side of the machine, thus leaving a free vertical space within the machine separating the motors, crank-shafts and links on one side of the machine from those on the other.

12. In a perforating-machine, the combination of a punch-head, two sets of punches, $a$, in different horizontal planes, two sets of actuating-levers, $d$, preferably of bell-crank form, two or more series of vertically-arranged motors, and two sets of links for joining the two sets of motor-armatures with the two sets of punches, one set of links being shorter than the others, as and for the purpose set forth.

13. In a perforating-machine, the combination of a punch-head having two sets of punches, $a$, in different horizontal planes, a chip-chute, Z, having two upward openings, $z'$, $z^2$, and a shield or housing for guiding the chips made by the upper row of punches away from those of the lower, as and for the purpose set forth.

14. In a perforating-machine, the combination of a punch-head having two sets of punches, $a$, in different horizontal planes, and a vibrating housing for surrounding the lower set of punches, as and for the purpose set forth.

15. In a perforating-machine, the combination of a punch-head having two series of punches, $a$, in different planes, a chip-chute, Z, a vibrating housing surrounding the lower row of said punches, and apparatus actuated by the motors of the perforator for vibrating said housing during operation of said perforator, as and for the purpose set forth.

16. In a perforating-machine, the combination of a punch-head having two series of punches $a$ in different planes, bell-cranks $d$ and corresponding links and motors for actuating said punches, a chip-chute Z, a housing surrounding the lower series of punches and a pin or pins $v^4$ actuated by said bell-cranks $d$ for vibrating said housing, as and for the purpose set forth.

17. In a perforating-machine, the combination of a supporting-plate $A^2$, a punch-head mounted thereon, punches supported within said punch-head, a chip-chute Z, extending downwardly through the center of said machine, and four vertically-arranged series of magnets B, symmetrically arranged beneath said punch-head for actuating said punches, as and for the purpose set forth.

18. In a perforating-machine, the combination of a box having a base-plate $A^9$, side plates A, top plate $A^2$, a punch-head mounted upon said top plate, punches $a$ supported by and operating within said punch-head, a chip-chute extending downwardly through the center of said machine, and four series of motors B, attached to said side plates, which are symmetrically arranged underneath the punch-head and around said chip-chute for actuating said punches, as and for the purpose set forth.

19. In a perforating-machine, the combination of a box or frame having a base-plate $A^9$, side plates A, top plate $A^2$, and a punch-head thereon within which punches $a$ are placed and operated, a chip-chute extending downwardly through said box, and two or more vertically-arranged series of motors B attached to said side plates for actuating said punches, as and for the purpose set forth.

20. In a perforating-machine, the combination of a box or frame having a base-plate $A^9$, side plates, A, top plate, $A^2$, and one or more vertically-arranged series of motors, B, and an auxiliary, movable frame surrounding each set of motors for carrying the armature-shafts and back-stops thereof, said frames having side pieces, $r\ r'$, as and for the purpose set forth.

21. In a perforating-machine, the combination of a box or frame having a base-plate $A^9$, side plates A, top plate $A^2$, and one or more vertically-arranged series of motors, B, and an auxiliary, movable frame surrounding each set of motors for carrying the armature-shafts and back-stops thereof, said frames having side pieces, $r$, $r'$, whose feet, $r^6$, are attached to the side plates A, as and for the purpose set forth.

22. In a perforating-machine, the combination of a supporting-box having side plates A, one or more vertically-arranged series of magnets B attached thereto, an auxiliary, removable frame for carrying the armature-shafts and back-stops surrounding said magnets, and feet, $r^6$, for connecting said auxiliary frame to the side plates, as and for the purpose set forth.

23. In a perforating-machine, the combination of a vertical series of magnets, B, an auxiliary, removable frame surrounding said magnets for carrying the armature-shafts, C, of said magnets and their back-stops, $r^4$, and bars, $r^5$, for holding said back-stops in said frame, as and for the purpose set forth.

24. In a perforating-machine, the combination of a supporting-box, a base-plate therefor, side plates, a top plate, a punch-head mounted upon said top plate carrying two or more series of punches, two or more series of punch-magnets symmetrically arranged beneath said punch-head, links for connecting said magnets with said punches, a downwardly-projecting chip-chute Z, a feed-wheel D, having movable teeth, pins or stops, a series of bars for actuating said teeth mounted upon said top plate, and a series of magnets placed beneath said top plate for actuating said bars to determine the feed of the paper, as and for the purpose set forth.

25. In a perforating-machine, the combination of a supporting-box, a base-plate, side plates, a top plate, a punch-head and feed-wheel mounted upon said top plate, four symmetrically-arranged series of punch-actuating motors B, placed beneath the punch-head, and a double range of feed-controlling magnets H H', also placed beneath said top plate, a series of feed-bars $f^3$ and links projecting downward from said bars to the armatures of said feed-controlling magnets, as and for the purpose set forth.

26. In a perforating-machine, the combination of a supporting-box, a top plate, punch-actuating motors placed beneath said top plate, a punch-head, a double range of feed-controlling magnets, H, H', also placed beneath the top plate, one set being staggered with reference to the other, a series of feed-bars $f^3$ and links projecting downward from said bars to the armatures of said feed-controlling magnets, as and for the purpose set forth.

27. In a perforating-machine, the combination of an inclosing box, a punch-head and a feed-wheel mounted upon the top plate of said box, a series of feed-controlling magnets arranged in two horizontal planes, and a removable frame or crate within which said magnets are placed, as and for the purpose set forth.

28. In a perforating-machine, the combination of a supporting-frame, a top plate bearing a punch-head and feed-wheel, punches carried within said punch-head, four horizontally-arranged sets of punch-magnets, links connecting the armatures of said magnets with the punches of said punch-head, auxiliary frames surrounding said punch-magnets carrying the armature-shafts therefor, a series of feed-controlling magnets and connections between said magnets and the feed-wheel for controlling the step-by-step movement of the latter and a removable frame within which said armatures and their magnets are supported, as and for the purpose set forth.

29. In a perforating-machine, the combination of a supporting-box, a top plate, a punch-head and feed-wheel mounted thereon, said feed-wheel being provided with a series of movable pins, stops or teeth, a series of radial bars, $f^3$, for actuating said pins, teeth or stops, a series of feed-controlling magnets placed beneath said top plate, and links of variable length extending from the armatures of said magnets upward to said bars, $f^3$, as and for the purpose set forth.

30. In a perforating-machine, the combination of a supporting-box, a base-plate $A^9$, side plates A, top plate $A^2$, a punch-head and feed-wheel D mounted upon said top plate, magnets symmetrically arranged on each side of the machine beneath said feed-wheel and punch-head for actuating the punches, shaft $E^2$ to which the feed-wheel is fastened and with which it rotates, a vertical shaft $D^2$ in line with shaft $E^2$ extending vertically downward from the top plate beneath the base-plate, a spring $D^6$ connecting the shafts $E^2$ and $D^2$ and a motor $D^4$ placed beneath said frame for actuating said feed-wheel, as and for the purpose set forth.

31. In a perforating-machine, the combination of a supporting frame or box having a base-plate and top plate, a feed-wheel D, mounted upon said top plate, a shaft $E^2$ upon which said feed-wheel is fastened, a vertical motor-shaft $D^2$ in line with shaft $E^2$, extending from the top downward through the base-plate, a spiral spring $D^6$ connecting said shafts $E^2$ and $D^2$, and a motor $D^4$ attached to the under side of said base-plate and applied to the lower end of said shaft $D^2$ for driving the same to actuate said feed-wheel.

32. In a perforating-machine, the combination of a supporting frame or box having a top plate and base-plate, a feed-wheel D, mounted upon said top plate, a short vertical shaft $E^2$ upon which said feed-wheel is fixed, a vertical shaft $D^2$ in line with said shaft $E^2$ extending downward from the top plate through the base-plate of said supporting-frame, and a coiled spring $D^6$ and spring-barrel for joining said shafts $E^2$, $D^2$, a motor $D^4$ placed beneath said base-plate, gearing connecting the armature of said motor with said shaft $D^2$ and a check-pawl $d^{18}$ for preventing backward rotation of the armature of said motor, as and for the purpose set forth.

33. In a perforating-machine, the combination of a variable step-by-step feed-wheel, a motor for driving the same, a shaft geared with said motor to one end of which is connected a coiled spring, the other end being normally connected with said feed-wheel, a manual device for disconnecting said feed-wheel from its shaft and motor, and a stop which, as the feed-wheel is disconnected, locks in a fixed position that part of the spring-barrel with which the feed-wheel is normally connected, as and for the purpose set forth.

34. In a perforating-machine, the combination of a variable step-by-step feed-wheel, a motor for driving the same, a shaft connecting with said motor, a coiled spring normally connecting said feed-wheel and shaft, a clutch normally connecting said feed-wheel to one end of said spring, a manual device for disconnecting said feed-wheel from said spring, and a stop for locking in fixed position the end of the spring with which said feed-wheel is normally connected after the same has been disconnected, as and for the purpose set forth.

35. In a perforating-machine, the combination of a variable step-by-step feed-wheel, a motor-shaft $D^2$, a spring-barrel $D^9$, spring $D^6$, plate E, having a circular range of apertures $V^7$, a clutch $E^{12}$, $E^{13}$, a shaft $D^3$, a feed-wheel D pinned thereon, a slotted collar $E^{18}$ rigidly fixed to said feed-wheel, a movable clutch having prongs $E^{15}$, a spiral spring $E^{20}$ and a groove $E^{14}$, a manual arm $V^4$, lifting-rollers $V^{13}$ having lost motion within the groove $E^{14}$, and a stop-pin $V^5$ whose lower end is forced into one of the apertures $V^7$ to lock plate E in a fixed position prior to the action of rollers $V^{13}$ within the groove $E^{14}$ to separate the teeth of $E^{12}$ from $E^{13}$, as and for the purpose set forth.

36. In a perforating-machine, the combination of a variable step-by-step feed-wheel D, a shaft $E^2$ to which it is fastened, a clutch $E^{12}$, $E^{13}$, which is normally locked, a spring-box consisting of a plate and hub E, and a drum $D^9$ to which the two ends of a coiled spring $D^6$ are respectively connected, a motor-shaft $D^2$, a manual key for unlocking said clutch and at the same time arresting the free end of spring $D^6$ against rotation by forcing a pin $V^5$ within one of a circular range of apertures $V^7$, and a spring $V^{15}$ for holding said pin $V^5$ normally over one of said apertures but which yields under the action of spring $D^6$ after disconnecting the feed-wheel in such manner that upon reconnecting the feed-wheel, the teeth of $E^{12}$ shall be opposite the apertures between the teeth $E^{13}$, thereby enabling easy reëngagement of said feed-wheel with the motor, as and for the purpose set forth.

37. In a perforating-machine, the combination of a variable step-by-step feed-wheel D, a motor for driving the same, a spring-barrel normally joining said motor and feed-wheel, a clutch for disconnecting said feed-wheel, a locking device for arresting the free end of said spiral spring momentarily before such disconnection, a manual lever for actuating said clutch and locking device, and means for holding said manual device in its upper or lower position, as may be desired to engage the feed-wheel with or disengage it from said motor, as and for the purpose set forth.

38. In a perforating-machine, the combination of a step-by-step feed-wheel D rotating upon a vertical axis for moving a fillet of paper, a stripper for said feed-wheel and an elongated horizontal chute through which said paper is thrust in a vertical plane, said chute having a long side opening for exposing the paper strip to the operator, as and for the purpose set forth.

39. In a perforating-machine, the combination of a step-by-step feed-wheel D, rotated upon a vertical axis, having peripheral teeth $d^2$ for moving a fillet of paper, a stripper having a slotted plate of metal between the prongs of which the teeth of said wheel pass, and an elongated channel or chute formed of a back plate $m^5$ and upper and lower ledges $m^3$, $m^4$, whereby the fillet of paper, after being perforated, is thrust along in a vertical plane within the observation of the operator.

40. In a perforating-machine, a feed-wheel rotating upon an upright axis, a long horizontal chute or guide through which a perforated tape is thrust edgewise or in a vertical plane by said feed-wheel, said chute being provided with a long opening facing the perforating operator, whereby said operator may observe a long length of the perforated tape as the same is delivered from the feed-wheel across the top of the perforating-machine.

41. In a perforating-machine, the combination of a step-by-step feed-wheel D having peripheral teeth $d^2$, a slotted stripper-plate having prongs $m$, $m'$, an upper plate $m^2$ and an elongated channel formed of a back plate $m^5$ and edge plates $m^3$, $m^4$, whereby the fillet of paper, after being perforated, may for a considerable distance be thrust along within the observation of the operator, as and for the purpose set forth.

42. In a perforating-machine, a feed-wheel rotating upon an upright axis, a long horizontal chute or guide through which a perforated tape of paper is thrust edgewise or in a vertical plane by said feed-wheel, whereby said tape is delivered from the feed-wheel across the top of the perforator apparatus.

43. In a perforating-machine, the combination of a step-by-step feed-wheel, a stripper and paper-chute therefor, a knife mounted upon said chute having a blade $m^8$ and a spring $m^{12}$ for normally holding said knife in a back position against a back-stop $m^9$, as and for the purpose set forth.

44. In a perforating-machine, the combination of a step-by-step feed-wheel, mounted upon a vertical axis, a stripper and a chute therefor through which the paper fillet is thrust in a vertical plane, said chute having a long side opening for exposing the paper to the operator over a considerable portion of its length, and a knife whose blade is normally held in back position and adapted to sever the fillet of paper at the completion of each message, as and for the purpose set forth.

45. In a perforating-machine, the combination of a step-by-step feed-wheel rotating upon a vertical axis, a long chute through which the paper is thrust in a vertical plane, said chute having a long side opening for exposing the paper to the operator over a considerable portion of its length, and a knife whose blade is normally held in back position in close proximity thereto for severing the tape at the completion of each message, as and for the purpose set forth.

46. In a perforating-machine, the combination of a series of punches, a feed-wheel having movable pins, teeth or stops, devices for actuating said pins, teeth or stops, a fixed stop for arresting the same, an arm for releasing said movable pins or teeth from the fixed stop, a magnet for lifting said arm through which current passes during the forward movement of said punches, and a spring or other retracting device which, as the punches are removed from the paper, comes into action to release said wheel, as and for the purpose set forth.

47. In a perforating-machine, the combination of a punch-head, a series of punches, a step-by-step feed-wheel having movable teeth or pins, a fixed stop for arresting said pins, an arm for releasing said pins or teeth from the fixed stop, a spring for depressing said arm, a magnet for raising the same and an electrical contact which automatically closes the circuit of said magnet as the punches are operated to effect perforation, as and for the purpose set forth.

CHARLES L. BUCKINGHAM.
EMIL GERMANN.

Witnesses:
ROBERT F. DOYLE,
JOHN C. SANDERS.